United States Patent [19]
Lefort

[11] 3,731,767
[45] May 8, 1973

[54] BRAKING DEVICE INCLUDING ANTI-SKID MEANS

[76] Inventor: Louis A. Lefort, 142 Beehman Street, Plattsburgh, N.Y. 12961

[22] Filed: May 13, 1971

[21] Appl. No.: 142,888

[52] U.S. Cl. ............188/72.2, 188/166, 188/187, 188/264 F, 188/359, 303/10, 303/21 F, 303/61
[51] Int. Cl. ............................................F16d 55/46
[58] Field of Search ......................303/21 F, 10, 11, 303/61; 188/359, 166, 170, 187, 264 F, 72.2, 181 A, 134; 192/35, 36

[56] References Cited

UNITED STATES PATENTS

| | | | |
|---|---|---|---|
| 1,974,390 | 9/1934 | Eason | 192/35 |
| 2,344,933 | 3/1944 | Lambert | 188/72.2 |
| 2,786,560 | 3/1957 | Ishoy | 188/72.2 X |
| 2,596,556 | 5/1952 | Hollerith | 188/141 X |
| 3,260,331 | 7/1966 | Borman, Jr. | 188/72.4 |

FOREIGN PATENTS OR APPLICATIONS

| | | | |
|---|---|---|---|
| 604,272 | 8/1960 | Canada | 188/264 P |

*Primary Examiner*—George E. A. Halvosa
*Attorney*—Clarence A. O'Brien and Harvey B. Jacobson

[57] ABSTRACT

A wheel braking system including first and second sections rotatable relative to each other and to a wheel support structure about coinciding axes. A first vehicle operator controlled brake assembly is provided for braking the first section relative to the support structure and the second section includes structure for mounting a vehicle wheel thereon. Also, second brake structure is provided for braking the second section against rotation relative to the first section with a predetermined minimum braking action and includes automatic control structure to increase the braking action thereof to prevent rotation of the second section relative to the first section in response to the second section rotating relative to the first section. Also, the second brake structure controls are operative, in response to termination of rotation of the second section relative to the first section due to an increased braking action thereon by the second brake structure as a result of rotation of the second section relative to the first section, to reduce the braking action of the second section relative to the first section to the aforementioned predetermined braking action or force, whereby full application of the operator controlled brake assembly of a vehicle will result in the braked wheel or wheels of that vehicle being braked by rapidly alternating increasing and decreasing braking forces even though the operator of the vehicle may "freeze" on the brake control with the latter fully applied.

17 Claims, 13 Drawing Figures

Patented May 8, 1973

Louis A. Lefort
INVENTOR.

BY *Clarence A. O'Brien*
and *Harvey B. Jacobson*
Attorneys

Patented May 8, 1973

Louis A. Lefort
INVENTOR

BY Clarence A. O'Brien
and Harvey B. Jacobson
Attorneys

Patented May 8, 1973

Louis A. Lefort
INVENTOR

BY Clarence A. O'Brien
and Harvey B. Jacobson
Attorneys

Patented May 8, 1973

Louis A. Lefort
INVENTOR

BY *Clarence A. O'Brien*
*and Harvey B. Jacobson*
Attorneys 3,731,767

BRAKING DEVICE INCLUDING ANTI-SKID MEANS

The braking device of the instant invention has been primarily designed for use on motor vehicles to provide a means whereby the braked wheels of a motor vehicle will not lock up and remain locked up in response to the operator of the vehicle "freezing" on the brake controls of the vehicle. However, the braking device may of course be found applicable to uses in numerous environments related as well as unrelated to vehicular operation.

The braking device further has been designed whereby its operation is fully dependent upon and controlled by the the operation of the conventional braking system of an associated vehicle. On lighter braking operations the braking device of the instant invention acts as the conventional braking system of the associated vehicle. This allows complete operation of the associated motor vehicle under normal operating conditions without any portion of the braking device of the instant invention being brought into operation other than to apply the predetermined minimum drag against rotation of the two main relatively rotatable components thereof, which predetermined minimum drag is accomplished, in the embodiment illustrated and described hereinafter, by means of a spring biased friction clutch assembly.

By constructing the braking device of the instant invention in a manner such that its operation is controlled entirely by operation of the existing braking system of the associated motor vehicle, the braking device of the instant invention may be readily applied to an existing motor vehicle merely by replacement of the wheel hub and brake disc or drum portions of the wheels of the vehicle.

The braking device of the instant invention is also designed in a manner whereby the individual vehicle wheels operatively associated therewith will have the braking action thereon varied according to the road traction provided each brake wheel of the vehicle. Thus, even though all of the braked wheels of an associated vehicle may be alternately braked with increasing and decreasing braking action, each of the braked wheels will be alternately braked with increasing and decreasing braking action according to the road or ground traction afforded that wheel and thus the alternate increasing and decreasing braking action on each of the braked wheels of the associated vehicle is effected completely independent of the operation of the other braked wheels of the vehicle.

The main object of this invention is to provide an automatic braking control for a braked vehicle wheel operative to modulate the braking action of the conventional brake assembly on the vehicle wheel when the braking action on the conventional vehicle wheel by the conventional braking system exceeds a predetermined magnitude.

Another object of this invention, in accordance with the immediately preceding object, is to provide a braking control that will be capable of alternately increasing and decreasing the braking action on an associated vehicle wheel above a predetermined braking force whenever the braking force on that vehicle wheel by the conventional braking system exceeds the predetermined minimum braking force.

Yet another object of this invention is to provide a braking device which may be readily utilized as a replacement for existing conventionally braked wheel support assemblies of existing motor vehicles.

A further object of this invention is to provide a braking device in accordance with the preceding object and constructed in a manner whereby the predetermined minimum braking force which must be exceeded by the conventional vehicle braking system before actuation of the braking device is brought into play may be adjusted as desired.

A final object of this invention to be specifically enumerated herein is to provide a braking device in accordance with the preceding objects which will conform to conventional forms of manufacture, be of relatively simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
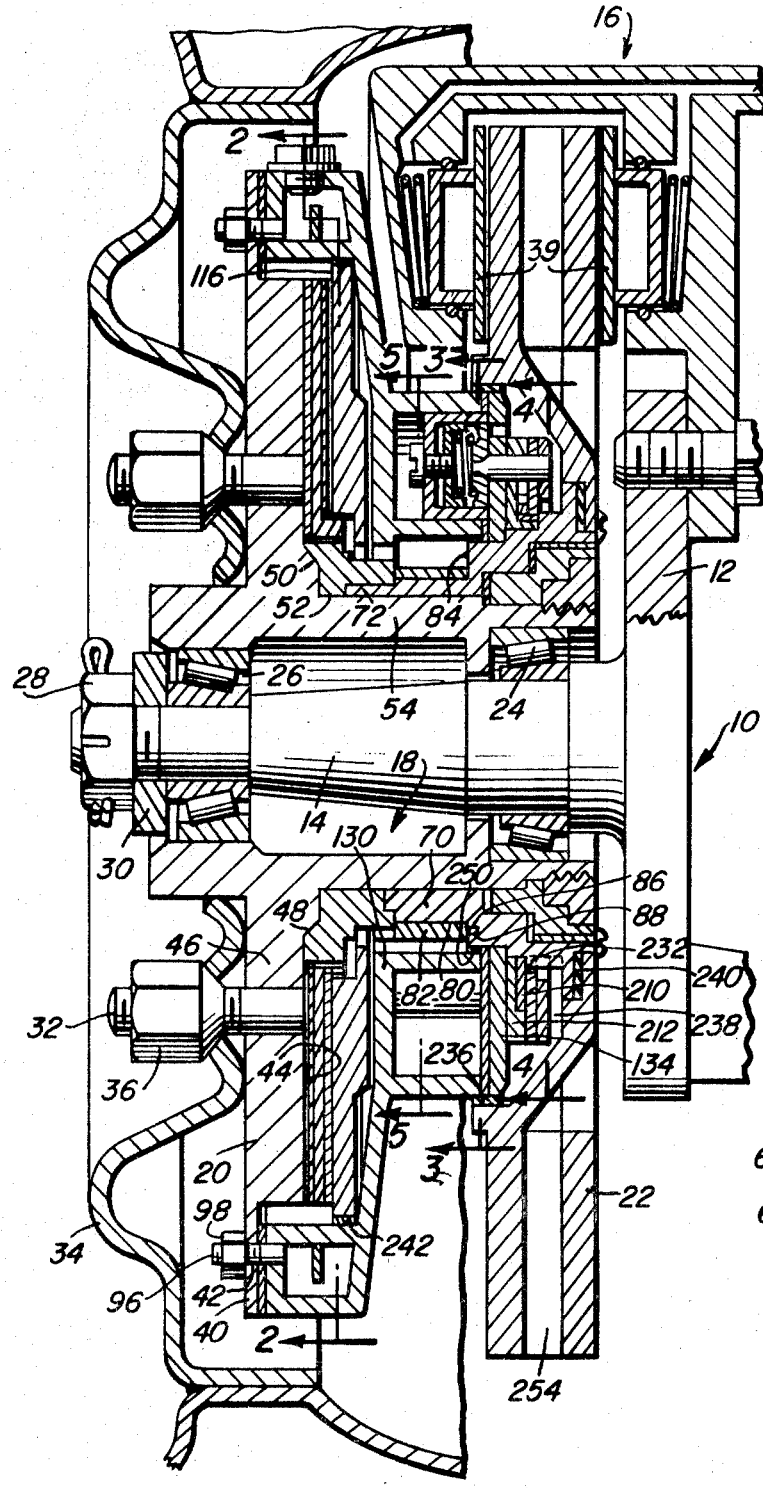
FIG. 1 is a vertical sectional view taken substantially upon a plane passing through the center of the braking device and with the latter illustrated in operative association with a disc brake assembly of a motor vehicle and the associated vehicle wheel.

Referring now more specifically to the drawings the numeral 10 generally designates the front wheel spindle assembly of a conventional form of motor vehicle including a mounting flange portion 12 and a spindle portion 14 upon which the mounting hub of a conventional vehicle wheel may be journaled, the conventional wheel mounting hub also including a brake disc portion with which the brake disc assembly referred to in general by the reference numeral 16 and is supported from the flange 12 is operatively associated.

It is also pointed out that in lieu of the disc brake assembly 16 the instant invention can be utilized in conjunction with drum brakes. Further, the braking device of the instant invention may be also utilized in conjunction with non-steerable rear wheels of vehicles and various designs of vehicle wheel journaling structures with which either drum brakes or disc brakes are operatively associated.

The braking device of the instant invention is referred to in general by the reference numeral 18 and includes first and second relatively rotatable sections 20 and 22. The section 20 is journaled from the spindle portion 14 by conventional roller bearing assemblies 24 and 26 and is secured on the spindle portion 14 by means of a threaded nut 28 backing a retaining washer 30, as is conventional.

The first section 20 includes outwardly projecting wheel mounting studs 32 upon which a conventional vehicle wheel 34 is secured by means of wheel lugs 36 and the vehicle wheel 34 may have any desired type of vehicle tire mounted thereon.

The second section 22 defines a ventilated brake disc with which disc brake assembly 16 is operatively associated and it is to be understood that the spindle assembly 10 comprises a part of a vehicle provided with a hydraulic or other fluid actuated braking system including at least one pressure line leading to the disc brake assembly 16 as at 38. Accordingly, the braking system of the vehicle may be actuated to cause the brake pads 39 of the disc brake assembly 16 to be clamped into engagement with the opposite axial faces of the ventilated brake disc 22 in order to brake the latter against rotation relative to the spindle portion 14.

In conventional braking systems the ventilated brake disc 22 is supported from the section 20 against rotation relative thereto in a rigid manner and accordingly braking of the ventilated brake disc 22 by the disc brake assembly 16 will brake the associated vehicle wheel such as the wheel 34. However, as pointed out hereinbefore, the second section comprising the ventilated brake disc 22 is rotatable relative to the first section 20 as will be hereinafter more fully apparent.

The section 20 includes an outer peripheral mounting flange 40 having peripherally spaced apertures 42 formed therethrough and the inner face 44 of the disc portion 46 of the section 20 defines a friction face. The inner periphery of the disc portion 46 includes a conical bearing surface 48 against which a corresponding conical surface 50 of a drive sleeve 52 journaled on the sleeve body 54 of the section 20 bears. The drive sleeve 52 includes radially outwardly projecting and circumferentially spaced drive lugs 56 and circumferentially spaced and radially inwardly projecting drive lugs 58. A clutch or brake disc referred to in general by the reference numeral 60 is provided and includes opposite side face friction surfaces 62 and 64 as well as an inner peripheral hub portion 66 relieved as at 68 for keying with the lugs 56. Accordingly, the clutch or brake disc 60 is keyed to the drive sleeve 52 for rotation therewith.

The second section or ventilated brake disc portion 22 includes a hub portion 70 which is journaled on the sleeve body 54 of the section 20 immediately inwardly of the drive sleeve 52. The hub portion 70 includes circumferentially spaced and axially projecting lugs 72 which are keyed in the recesses 74 defined between the drive lugs 58 and accordingly, the hub portion 70 of the second section 22 is keyed to the drive sleeve 52 for rotation therewith and the clutch or brake disc 60 is therefore keyed to the section 22. However, it will be noted that slight axial shifting of the hub portion 66 of the disc 60 on the drive sleeve 52 is afforded.

The hub portion 70 of the section 22 includes an eccentric 80 upon which an eccentric cam ring 82 is mounted and the hub portion 70 includes a radial shoulder 84 defining the inner limit of the eccentric 80 and in which circumferentially spaced axially opening indexing bores 86 are formed, the eccentric ring 80 including an indexing pin 88 for keying in a selected indexing bore 86.

The surface of the eccentric 80 is cylindrical but is eccentrically located relative to the center of the spindle portion 14 and sleeve body 54 of the section 20. In addition, the inner and outer surfaces of the eccentric ring 82 are cylindrical but slightly eccentric relative to each other. Accordingly, the amount of eccentricity of the outer surface of the ring 82 relative to the shank portion 14 may be adjusted.

Figure 6:
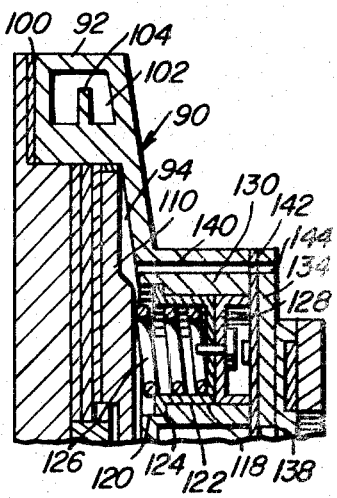
FIG. 6 is a fragmentary sectional view taken substantially upon the plane indicated by the section line 6—6 of FIG. 3.
Figure 7:
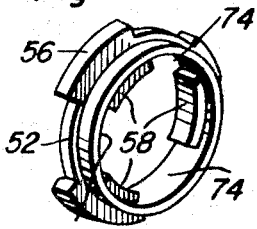
FIG. 7 is a perspective view of the drive sleeve provided for driving the friction clutch-brake disc through the wheel hub mounted pressure plate of the braking device.
Figure 8:
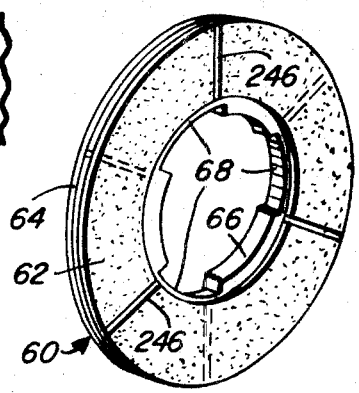
FIG. 8 is a perspective view of the clutch-brake disc.

A pressure unit referred to in general by the reference numeral 90 is provided and defines a disc having an outer peripheral portion 92 and an axially opening cavity or chamber 94 in its outer side bound by the outer peripheral portion 92, see FIG. 6. The outer peripheral portion 92 includes a plurality of circumferentially placed axially projecting studs 96 secured through the apertures 42 by means of threaded nuts 98 and a seal 100 is disposed between the outer axially facing and opposing surfaces of the mounting flange 40 and the outer peripheral portion 92.

The outer peripheral portion 92 is hollow so as to define a fluid reservoir 102 and the reservoir 102 includes a partial baffle 104. Three large circumferentially spaced ports 106, see FIG. 2, communicate the outer side of the reservoir 102 with the outer portion of the chamber or cavity 94 and three circumferentially spaced pairs of smaller ports 108 communicate the inner side of the reservoir 102 with the inner or closed side of the cavity or chamber 94.

A pressure plate 110 including three circumferentially spaced and radially outwardly projecting lugs 112 is seated in the inner end of the cavity or chamber 94 with its lugs 112 keyed in the three circumferentially spaced relieved areas 114 of the pressure unit or disc 90 and the pressure plate 110 includes a central opening through which the drive sleeve 52 is received. The outer surface 116, see FIG. 1, of the pressure plate 110 defines a friction surface opposing the friction surface 62 of the clutch or brake disc 60 in the same manner that the friction surface 64 of the disc 60 is opposed by the friction surface 44.

The back side of the pressure unit or disc 90 includes three circumferentially spaced bores 118 extending therethrough including outer and counter bores 120 (see FIG. 6) which open into the back side of the cavity or chamber 94. Three flanged retaining cups 122 are snugly and slidably received in the bores 118 with their retaining flanges 124 disposed in the counter bores 120 and three compression springs 126 have their rear ends seated in the inner ends of the cups 122 and their forward ends abutted against the rear face of the pressure plate 110. The rear end wall of each cup 122 has rearwardly opening piston cup 128 secured thereto for a purpose to be hereinafter more fully set forth and the rear face of the radially and axially thickened inner peripheral hub portion 130 of the disc 90 has three circumferentially spaced and rearwardly axially opening recesses 132, see FIG. 3, formed therein. A rear annular cover plate 134 is secured over the rear or inner end face of the hub portion 30 by means of suitable fasteners 136, see FIG. 3. A gasket 138 is disposed between the opposing faces of the hub portion 130 and the cover plate 134 and the hub portion 130, gasket 138 and cover plate 134 include circumferentially spaced sets of registered bores 140, 142 and 144 defining return passages for fluid to the inner side of the cavity or chamber 94 into which the forward or outer ends of the bores 140 open behind the pressure plate 110.

Figure 5:
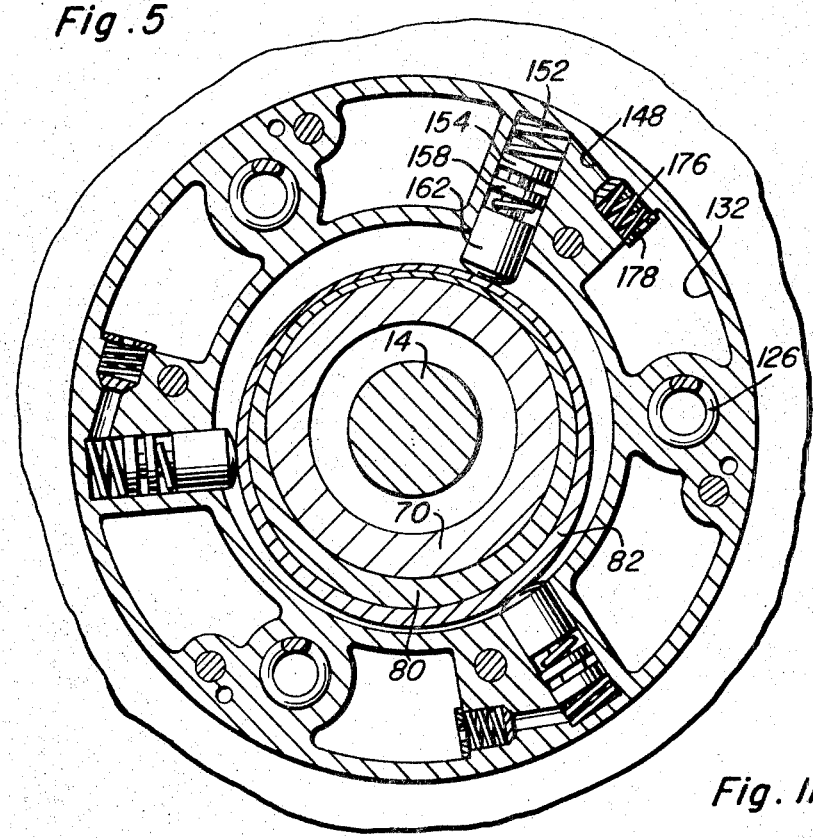
FIG. 5 is a vertical sectional view taken substantially upon the plane indicated by the section line 5—5 of FIG. 1.
Figure 11:
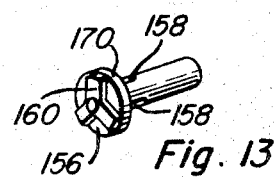
FIG. 11 is a perspective view of the check valve portion of one of the fluid pressure pumping assemblies.
Figure 12:
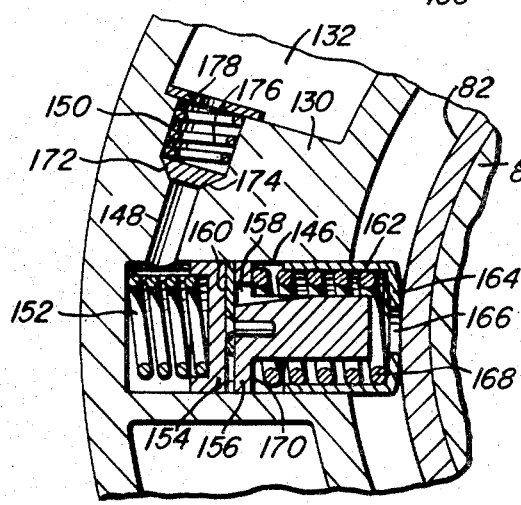
FIG. 12 is an enlarged fragmentary sectional view illustrating the left hand portion of FIG. 5 on a larger scale.

With attention now invited more specifically to FIGS. 5 and 12 of the drawings, it may be seen that the hub portion 130 includes circumferentially spaced radially inwardly opening blind bores 146 whose outer ends are communicated with corresponding recesses 132 by means of bores 148 counter-bored at their ends opening into the recesses 132 as at 150. Each of the bores 146 has a compression spring 152 seated therein and an inwardly opening resilient piston cup 154 is disposed over the inner end of each spring 152. Further, a fluid flow by-pass piston 156 is disposed in each bore 146 behind the corresponding cup 154 and each piston 156 includes a fluid passage 158 valved at its discharge end by means of a reed-type check valve 160 backed by the piston cup 154. Further, a rigid spring retainer and piston cup 162 is disposed in the radial innermost end of each bore 146 and includes a slightly convexed inner end wall 164 slidably engaged with the outer surface 166 of the ring 82 and provided with a central aperture 166. A compression spring 168 is disposed in each cup 162 and has one end thereof abutted against the inner surface of the corresponding end wall 164 and the other end thereof abutted against the opposing axial face of the head 170 of the corresponding piston 156.

The inner end of each counter-bore 150 defines a conical seating surface 172 extending about the bore 148 and a conical check valve member 174 is seated against each seat 172 and biased theretoward by means of a corresponding compression spring 176 retained in each counter-bore 150 by means of a centrally apertured retaining washer 178 secured over the open end of each counter-bore 150.

Figure 3:
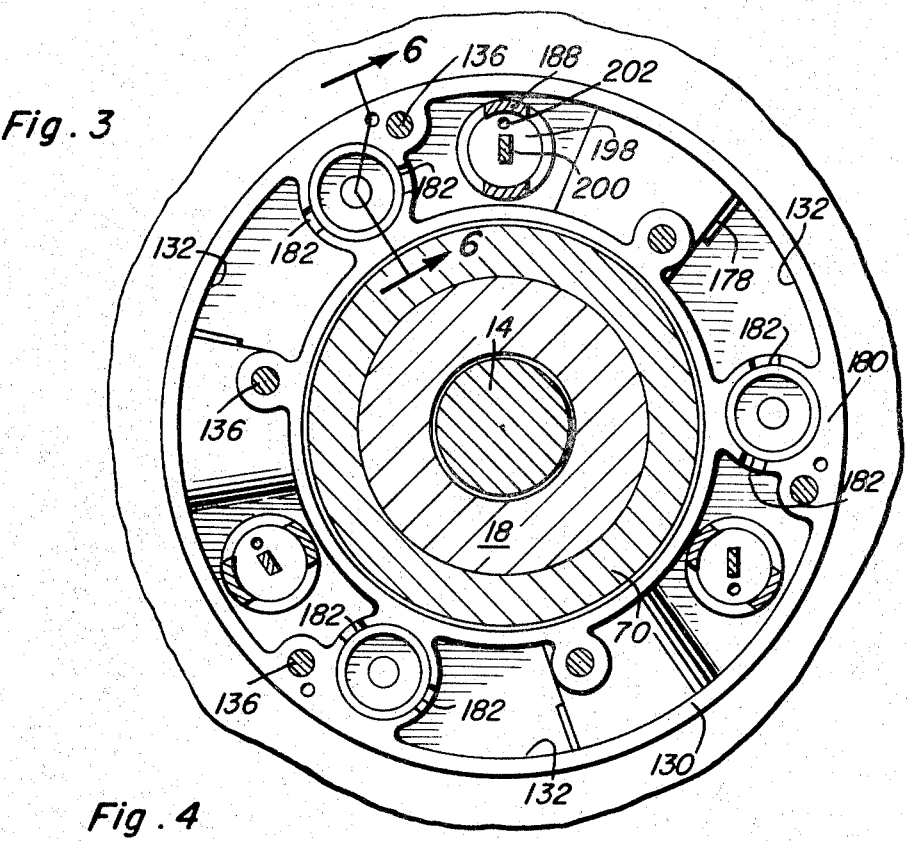
FIG. 3 is a fragmentary sectional view taken substantially upon the plane indicated by the section line 3—3 of FIG. 1.

The inner end face 180 of the hub portion 130 includes a pair of fluid passage notches 182 communicating generally diametrically opposite portions of each bore 118 with the adjacent recesses 132, see FIG. 3.

Further, the cover plate 134, which is annular in configuration, includes three circumferentially spaced journal bores 184 and attendant pressure relief bores 186. A retaining bracket 188 is supported from the inner surface of the cover plate 134 in registry with each pair of bores 184 and 186 and guidingly supports a spring retaining cup 190 therefrom. One end of a compression spring 192 is seated in each cup 190 and the other end of each compression spring 192 is embraced about a central projection 194 carried by a valve disc 196 including a planar face 198 abutted flush against the inner surface of the cover plate 134 in overlying relation to the corresponding ends of the associated bores 184 and 186. Each valve disc 196 includes a central non-circular recess 200 which opens toward the cover plate 134 and a through bore 202 registrable with the corresponding bore 186. A valve actuator 204 is provided for each set of bores 184 and 186 and includes a shank portion 206 rotatably journaled in the corresponding bore 184 and having a non-circular projection 208 on its free end snugly engagable in the corresponding non-circular recess 200 formed in the associated valve disc 202.

A toothed ratchet disc 210 is journaled on a retainer ring 212 secured to the outer surface of the cover plate 134, see FIG. 1, and each valve actuator 204 includes an elongated transverse head 214 supporting a ratchet pin 216 at one end. The cover plate 134 includes circumferentially spaced pairs of outwardly projecting pins 218 and three double leaf springs 220 hav their free ends 222 engagable with the end portion of the corresponding head of the associated valve actuator 204 so as to yieldingly bias the valve actuators 204 to positions with their elongated heads extending generally radially of the center axis of the spindle or shank portion 14. The base or mounting ends 224 of each of the springs 220 are engaged over the corresponding pins 218 for support of leaf springs 220 from the cover plate 134.

When the heads 214 extend generally along a radii of the spindle portion 14, the valve discs 196 are rotated to positions with the bores 202 thereof registered with the bores 186 whereby fluid pressure from the chambers or recesses 132 may be vented therefrom through the bores 202 and 186. However, when the ratchet disc 210 is rotated so as to angularly displace the heads 214 from generally radially extending positions to positions such as that illustrated in FIG. 4 of the drawings, the bores 202 are moved out of registry with the bores 186 to prevent venting of fluid pressure from the recesses 132.

Although the bores 186 are spaced equally about the outer periphery of the hub portion 130, the ratchet disc 210 includes a number of teeth 226 engagable with the pins 216 which is divisable by three with one tooth remaining. Accordingly, the spacing between the teeth 226 of the ratchet disc 216 prevents the valve actuators 204 from operating in unison and thereby precludes any possibility of all three of the heads 214 being rotated to the position of the head 214 illustrated in FIG. 4 of the drawings when the disc 210 is stationary relative to the hub 130. Thus, it is impossible for all of the pressure relief bores 186 to be simultaneously closed when the ratchet disc 210 is stationary relative to the cover plate 134.

Figures 2, 9:
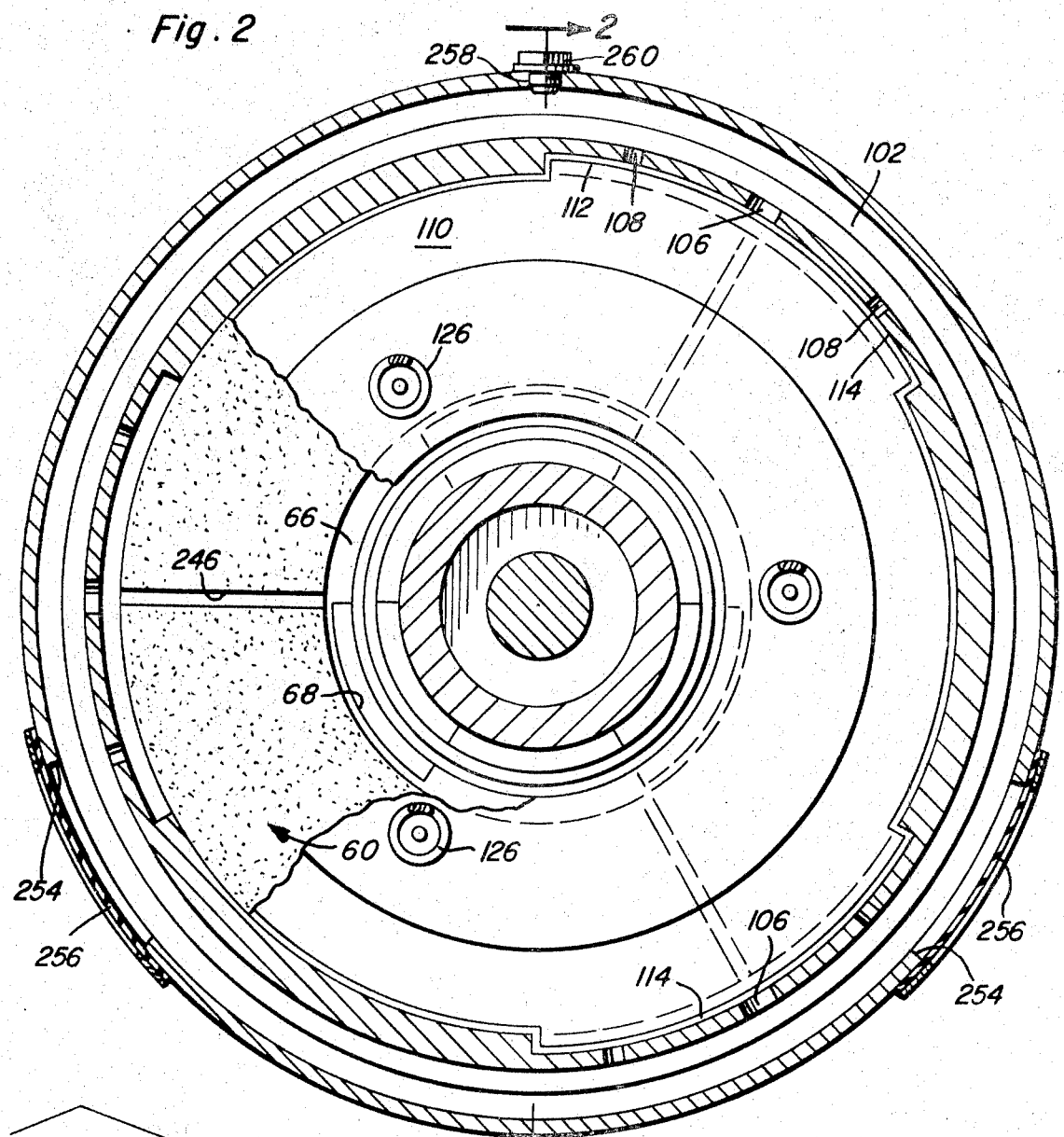
FIG. 2 is a fragmentary vertical sectional view taken substantially upon the plane indicated by the section line 2—2 of FIG. 1 and with portions of the pressure plate portion of the internal brake-clutch of the braking device being broken away.
FIG. 9 is an exploded perspective view of one of the pressure relief valves and a portion of the actuating mechanism therefor.

The ratchet disc or ring 210 includes three equally circumferentially spaced notches 230 in which three equally circumferentially spaced indexing lugs 232, see FIGS. 1, 2 and 9, carried by the hub portion 70 of the second section 22 are seated. Accordingly, the ratchet ring or disc 210 is keyed to the second section 22 for rotation therewith.

A seal 236 is disposed between the portion of the ventilated brake disc or second section 22 defining the outer extremity of the outwardly opening central cavity 238 defined by the second section 22, see FIG. 1, and the outer periphery of the cover plate 134. In addition, a seal 240 is disposed between the inner marginal portions of the ventilated brake disc 22 and the inner end of the hub portion 70 and the seals 236 and 238 thereby define a closed fluid compartment within the chamber 238 into which the bores 186 open. Fluid within the compartment or chamber 238 may be discharged therefrom into the chamber or compartment 94 within the pressure unit 90 through the bores 140, 142 and 144, the latter of which open into the chamber 238.

The outer periphery of the pressure disc 110 includes a circumferentially seal 242 which seals the outer periphery of the pressure plate 110 against the opposing walls of the chamber or compartment 94 formed in the pressure unit 90. The bores 108 open into the chamber or cavity 94 inwardly of or behind the pressure disc 110 and the bores or passages 106 open into the outer portion of the chamber or compartment 94 outwardly of the pressure disc 110.

The friction surfaces 62 and 64 on the clutch or brake disc 60 include staggered radial slots 246 for radial inward movement of fluid between the clutch or brake disc 60 and the surfaces 44 and 116. Also, an annular seal 250 is disposed between the inner periphery of the hub portion 130 and the hub portion 70 whereby the chamber 238 is sealed from the annular compartment in which the ring 82 and the adjacent ends of the piston cups 162 are disposed.

In operation, it is to be noted that the braking device 18 is substituted for the conventional wheel mounting hub portion and integral brake disc of a conventional motor vehicle journaled on the spindle or shank portion 14. The ventilated brake disc 22 of the braking device 18 comprises a full operative replacement for the conventional brake disc with the possible exception that the disc 22 includes radially extending ventilating passages 254 which may not be present on the conventional brake disc which is replaced.

In any event, the braking apparatus or device 18 is mounted on the spindle portion 14 by means of the roller bearings 24 and 26, the retaining washer 30 and the threaded nut 28.

It must be understood initially that the springs 126 in FIG. 6 are backed by the retaining cups 122 in their limit positions of movement to the right as viewed in FIG. 6 and thus yieldingly bias the pressure plate 110 to the left as viewed in FIG. 6 whereupon the clutch or brake disc 60 is clamped between the friction surfaces 44 and 116 of FIG. 1. Accordingly, inasmuch as the hub portion of the second section 22 including the ventilated brake disc is keyed to the drive sleeve 52 and the latter is keyed to the clutch or brake disc 60, the ventilated brake disc 22 is frictionally coupled to the first section 20 upon which the vehicle wheel 34 is mounted. Accordingly, actuation of the disc brake assembly 16 to urge the brake pads 39 into engagement with the opposite axial faces of the ventilated brake disc 22 causes not only the ventilated brake disc 22 to be braked but also the first section 20 of the braking device 18 upon which the vehicle wheel 34 is mounted.

Of course, the preloading of the pressure plate 110 may be as desired by selecting the proper springs 126. If for instance the assocated vehicle is expected to be used only on dry highways stronger springs 126 may be utilized than in a braking device mounted on a vehicle which may be used on wet street or snow-covered streets. In any event, the friction coupling between the sections 20 and 22 effected by the springs 126 is preferably at least slightly less than that frictional coupling which will be effective to cause the associated wheel to slide on the slickest road surface expected to be encountered. In this manner, even should the driver of the associated vehicle freeze on the brake control with the conventional brake fully applied the tire carried by the vehicle wheel 34 will not slide on the pavement since the friction coupling between the ventilated brake disc 22 and the vehicle wheel 34 is less than that required for the tire to slide.

By providing the friction coupling between the ventilated disc 22 and the vehicle wheel 34, maximum application of the conventional vehicle disc brake assembly 16 will result in the ventilated disc 22 being braked to a stop while the vehicle wheel 34 continues to rotate.

As rotation occurs between the hub portions 70 and 130, the piston cups 162 riding on the cam ring 82 are oscillated back and forth in the bores 146 so that hydraulic fluid from the reservoir 102 is drawn therefrom through the passages 106 and into the outer periphery of the chamber 94 disposed outward of the outer periphery of the pressure plate 110 and the seal 242 carried thereby. The hydraulic fluid then passes radially inwardly between the friction surfaces 44 and 116 via the grooves 246 and into the annular cavity bound by the hub portion 130 between the latter and the hub portion 70 upon which the eccentric ring 82 is mounted. This hydraulic fluid, due to reciprocation of the piston cups 162 by the cam ring 82 enters the piston cups 162 through the bores 166 and passes the heads 170 through the passages 158 controlled by the reed valves 160. This fluid then passes around the piston cups 154 and is pumped through the bores 148 and past the check valve members 174 into the recesses 132. Of course, inasmuch as the hub portion 70 is keyed to the ratchet ring 210 through the interengagement of the lugs 232 in the notches 230, the cover plate 134 carried by the hub portion 130 is rotated relative to the ratchet ring 210 and thus the heads 214 of the valve assemblies 204 are angularly displaced from radially extending positions to positions thereof corresponding to the position illustrated in the lower right hand portion of FIG. 4 whereupon the bores 202 are moved out of registry with the bores 186 and thereby bleeding of hydraulic fluid under pressure from the recesses 132 is prevented. As the pressure within the recesses 132 builds up, fluid from the recesses 132 flows through the notches 182 into the piston cups 128 of FIG. 6 behind the retainer cups 122 whereby the compression springs 126 are further compressed to urge the pressure plate 110 into tighter engagement with the friction surface 62 and the friction surface 64 into tighter engagement with the friction surface 44. This increase in frictional engagement between the surfaces 44 and 116 and the surfaces 62 and 64 increases the friction coupling between the sections 20 and 22 and thereby serves to gradually lock the section 20 against rotation relative to the section 22. However, as soon as rotation of the section 20 relative to the section 22 is almost terminated, the heads 214 of the valve assemblies 204 are allowed to momentarily return to positions extending generally radially of the shank portion 14 with the bores 202 registered with the bores 186 whereby the increased fluid pressure acting upon the retaining cups 122 for the springs 126 is relieved, at least in part, through the bores 186 and into the chamber 238 for subsequent passage through the bores 144, 142 and 140 into the inner end of the chamber or recess 94 from where the relieved fluid passes back into the reservoir 102 through the ports 108.

Should the relieving of fluid pressure from the recesses 132 through the bores 186 enable the section 20 to increase its speed of rotation relative to the section 22, the period of momentary registry of the bores 202 with the bores 186 are reduced and the pumping action of the piston cups 162 riding on the eccentric cam ring 82 is increased to thereby again raise the fluid pressure within the chambers 132 so as to increase the friction coupling between the sections 20 and 22. This increase of friction coupling will of course decrease the speed of rotation of the section 20 relative to the section 22.

The preceding description of increasing, decreasing and increasing of the friction coupling between the sections 20 and 22 occurs quite rapidly but in a controlled manner with the sizes of the various bores, ports and passages determining the speed of operation of the braking device in a cycling manner. Of course, different sized bores, ports and passages will be utilized according to the weight of the associated vehicle, the type of of tires the associated vehicle will be equipped with, the type of over the road surface the associated vehicle will experience and the slickest road surface over which the associated vehicle will be expected to travel.

In addition, operation of the braking device 18 may be altered by changing the angular positioning of the eccentric cam ring 82 relative to the hub portion 70.

The braking device 18 will not only serve to increase the maximum braking power which will be available to the driver of an associated vehicle but also to provide a means whereby steerage and proper tracking of the associated vehicle will be maintained even if the driver of the associated vehicle should freeze on his foot brake. Also, under extreme braking conditions the ventilated brake disc 22 will be braked as stationary relative to the spindle 10 with the result that the operating life of the pads 39 will be extended. Of course, under extreme braking conditions relative rotation and thus wear occurs between the friction surfaces 62 and 64 and the friction surfaces 116 and 44. However, these friction surfaces are cooled by the hydraulic braking fluid within the braking device 10 as the fluid is first pumped from the outer periphery of the power unit 90 radially inwardly of the latter and then to the recesses 132 subsequent to the fluid passing radially outwardly in the chamber 94 behind the pressure plate 110 and back into the reservoir 102 and around the baffle 104. This circulatory movement of the fluid places the same in good heat transfer relation with the outer peripheral portion 92 of the power unit 90 and thus considerable heat generated between the friction surfaces 60, 64, 116 and 44 is dissipated to the ambient atmosphere.

Inasmuch as hydraulic fluid expands and contracts when heated and cooled, respectively the outer peripheral portion 92 of the power unit 90 includes three circumferentially spaced ports 254 sealed closed by means of fluid impervious flexible closure panels 256. In this manner, expansion and contraction of fluid within the braking device 18 may be compensated for. In addition, the outer peripheral portion 92 of the power unit 90 includes a threaded full aperture 258 in which a removable plug 260 is threadedly engaged. Accordingly, expansion and contraction of the fluid within the braking device 18 due to changes in temperature is automatically compensated for and the fluid within the braking device 18 may be readily changed when desired.

As hereinbefore set forth, should the increase in fluid pressure behind the cups 128 sufficiently increase the compression of the springs 126 to terminate rotation of the section 20 upon which the vehicle wheel 34 is mounted relative to the ventilated brake disc 22, inasmuch as the spacing between the teeth 226 on the ratchet ring 210 is such to prevent all three of the valve discs 196 being maintained in angular position with the bores 202 thereof out of registry with the corresponding bores 186, relief of fluid pressure in at least one of the recesses 132 is assured to thereby enable the first section 20 to again rotate relative to the second section 22.

It will of course be understood that at least a minimum friction coupling between the sections 20 and 22 must be afforded by the compression springs 126 and the pressure plate 110 otherwise an associated vehicle might not be able to be brought to a full stop on an incline. However, the braking device 18 may, in most cases, be so adjusted that full application of the disc brake assembly 18 will result in generally continuous rotation of the first section 20 at a speed slower than road speed until such time as the associated vehicle is braked to almost a complete standstill, the braking device 18 in most cases being operative to preclude full lock up of the section 20 relative to the section 22.

Figure 10:
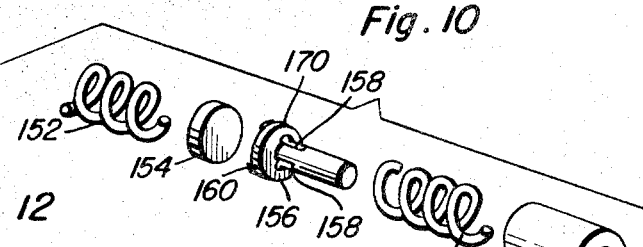
FIG. 10 is an exploded perspective view of one of the three fluid pressure pumping assemblies.
Figure 13:
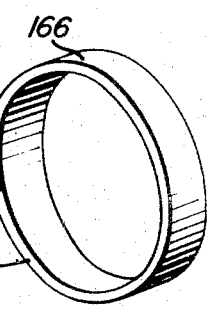
FIG. 13 is a perspective view of the eccentric pumping ring of the braking device.

With reference again to FIGS. 10 and 12 of the drawings, should the efficiency of the clutch assembly be impaired through wear or for other reasons, it is possible that normal braking pressure usually sufficient to cause the clutch to lock up will not result in the clutch locking and thus slippage in the clutch assembly will persist. If this condition does exist, on a long downward incline requiring sustained braking the pressure of the hydraulic fluid in the recesses 132 would build up until rupture of the portions of the braking device defining the recesses 132 occurs.

However, as such excess pressure is approached, greater pressures are required to move the pistons 156 and when these pressures exceed a predetermined value although the cups 162 are still oscillated radially by the ring 82, the compression spring 168 absorbs all of the oscillatory movement of the cups 162 without imparting pumping oscillatory movement to the pistons 156. Thus, excessive pressures within the recesses 132 are prevented.

Figure 4:
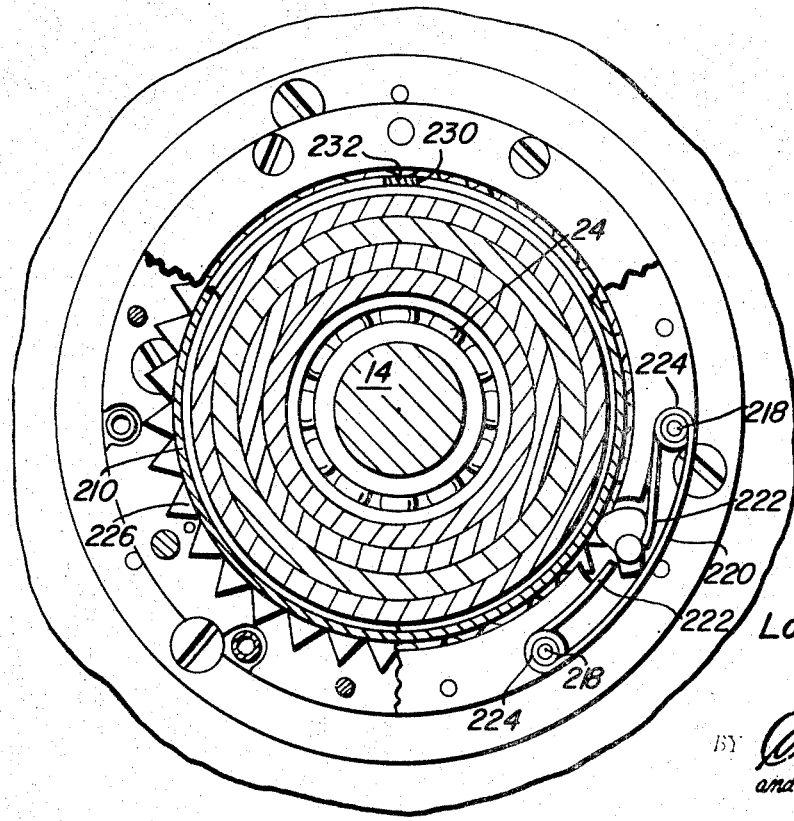
FIG. 4 is a sectional view taken substantially upon the plane indicated by the section line 4—4 of FIG. 1 and with portions of the actuating fluid system bleeding structure broken away.

Finally, the double leaf springs 220 illustrated in FIG. 4 are identical and symmetrical thereby rendering the springs 220 interchangeable and reversable. It is of course also to be understood that the valve actuators 204 are operable to perform their intended function in both directions of rotation of the section 20. Also, the entire braking device is symmetrical and thus may be readily statically and dynamically balanced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a wheel braking system including first and second sections journaled from a wheel support structure for rotation relative thereto and each other about coinciding axes and having first brake means for selectively braking the second section relative to said support structure and second fluid actuated brake means for braking said first section against rotation relative to said second section, said first section including an outer peripheral portion spaced radially outwardly from and extending about said coinciding axes defining a fluid reservoir for said system, at least some of said outer peripheral portion defining said reservoir being constructed of a material having good heat transfer properties.

2. In a braking system including first and second relatively rotatable sections, brake means operatively connected between said sections continuously applying a predetermined minimum braking force on said sections against relative rotation of the latter, said brake means including initially preloaded actuating spring means and fluid pressure controlled assist means for automatically progressively increasing the loading of said spring means in response to relative rotation of said sections and automatically decreasing the loading of said spring means back toward said predetermined braking force in response to subsequent termination of relative rotation of said sections.

3. The combination of claim 2 wherein said assist means includes a fluid pressure actuating system, said first and second sections including fluid pumping means with a fluid pressure output means communicated with said actuating system, said fluid pumping system including means operative to develop fluid pressure in said output means in response to relative rotation between said first and second sections, said fluid pressure actuating system including fluid pressure bleed off means operable to bleed fluid pressure from said system in response to termination of relative rotation between said first and second sections.

4. The combination of claim 2, wherein said brake means includes coacting friction surfaces carried by said first and second sections, and pump means operative, in response to relative rotation of said sections, to pump cooling fluid over said surfaces.

5. The combination of claim 4, wherein said system includes an oil reservoir carried by one of said sections from and to which said cooling fluid is pumped in response to relative rotation of said sections.

6. The combination of claim 5 wherein said means for increasing the loading of said spring means includes fluid pressure actuator means to which fluid under pressure is supplied in from said pump in response to relative rotation of said sections.

7. The combination of claim 6, including excess pressure sensing means operative to sense excess pressure at said fluid pressure actuator means and to prevent further build up of fluid pressure at said fluid pressure actuator means in response to further relative rotation of said sections.

8. A support structure, an assembly journaled on said support structure for 360° rotation relative thereto, said assembly including first and second sections each rotatable relative to each other and said support structure about the axis of rotation of said assembly relative to said support structure, said assembly further including first brake means operatively associated with said sections continuously braking said sections against rotation relative to each other with a predetermined minimum braking force, said first brake means including fluid pressure controlled assist means operative, in response to relative rotation of said sections, to progressively increase the braking force of said brake means to terminate relative rotation of said sections, and operative in response to subsequent termination of relative rotation of said sections, to progressively reduce said braking force back toward said predetermined braking force, and second brake means operative to variably brake said second section relative to said support structure with a braking force ranging between a braking force below said predetermined braking force and a braking force above said predetermined braking force.

9. The combination of claim 8, wherein said support structure includes a wheel support structure and said assembly includes a wheel supported therefrom.

10. The combination of claim 9, wherein said wheel is mounted on said first section against rotation relative thereto.

11. The combination of claim 8 wherein said first brake means includes a spring pre-loaded brake assembly including a fluid pressure booster section, said sections including portions thereof defining the stator and rotor components of a fluid pump operative to pump fluid under pressure to said fluid pressure booster section in response to relative rotation between said sections, said fluid pressure booster section including a throttled fluid pressure relief for relieving the fluid pressure in said fluid pressure booster section in response to termination of relative rotation of said first and second sections.

12. The combination of claim 11, wherein said fluid pressure booster section includes a fluid reservoir extending about the outer periphery of said first section and which is therefore subject to cooling by the ambient fluid whenever said first section is rotating relative to said support structure, said support structure including a wheel support structure and said assembly including a wheel journaled therefrom, said wheel being mounted on said first section against rotation relative thereto.

13. The combination of claim 11, wherein said fluid pressure booster section includes a fluid reservoir extending about the outer periphery of said first section and which is therefore subject to cooling by the ambient fluid whenever said first section is rotating relative to said support structure.

14. The combination of claim 13, wherein said reservoir includes an expandable section to compensate for expansion and contraction of the brake actuating fluid of said fluid pressure booster section as the temperature of said actuating fluid is varied.

13. The combination of claim 8, wherein said assist means includes a fluid pressure actuating system, said first and second sections including fluid pumping means with a fluid pressure output means communicated with said actuating system, said fluid pumping system including means operative to develope fluid pressure in said output means in response to relative rotation between said first and second sections, said fluid pressure actuating system including fluid pressure bleed off means operable to bleed fluid pressure from said system in response to termination of relative rotation between said first and second sections.

16. The combination of claim 15 wherein said fluid pressure actuating system comprises a closed system including a fluid reservoir from which fluid is pumped in response to relative rotation between said first and second sections, said fluid pressure bleed off means being operative to bleed fluid pressure from said fluid pressure output means to said reservoir.

17. The combination of claim 16, wherein said fluid reservoir is defined in an outer peripheral portion of said first section extending about and spaced radially outwardly from the axis of relative rotation of said first and second sections.

* * * * *